(12) United States Patent
Zhang et al.

(10) Patent No.: US 10,216,548 B1
(45) Date of Patent: Feb. 26, 2019

(54) DYNAMIC AND ADAPTIVE PROGRAMMATIC INTERFACE SELECTION (DAPIS)

(71) Applicant: VCE Company, LLC, Richardson, TX (US)

(72) Inventors: Ying Victor Zhang, Plano, TX (US); Rajesh Nandyalam, Whitinsville, MA (US)

(73) Assignee: VCE IP Holding Company LLC, Richardson, TX (US)

( * ) Notice: Subject to any disclaimer, the term of this patent is extended or adjusted under 35 U.S.C. 154(b) by 111 days.

(21) Appl. No.: 14/134,543

(22) Filed: Dec. 19, 2013

(51) Int. Cl.
*G06F 9/54* (2006.01)

(52) U.S. Cl.
CPC ..................................... *G06F 9/54* (2013.01)

(58) Field of Classification Search
CPC ......... G06F 9/54; G06F 9/541; G06F 9/44521
See application file for complete search history.

(56) References Cited

U.S. PATENT DOCUMENTS

| | | | |
|---|---|---|---|
| 6,631,478 B1 * | 10/2003 | Wang | G06F 11/1471 714/15 |
| 7,134,133 B1 * | 11/2006 | Wugofski | 725/39 |
| 2005/0160432 A1 * | 7/2005 | Gallagher | G06F 17/30415 719/313 |
| 2006/0174252 A1 * | 8/2006 | Besbris | G06F 9/445 719/330 |
| 2008/0163264 A1 * | 7/2008 | Berajawala et al. | 719/328 |
| 2012/0271953 A1 * | 10/2012 | Gulley et al. | 709/226 |
| 2014/0380341 A1 * | 12/2014 | Geimer | G06F 8/71 719/328 |

* cited by examiner

*Primary Examiner* — Umut Onat
(74) *Attorney, Agent, or Firm* — Polsinelli PC

(57) ABSTRACT

Aspects of the present disclosure involve converged infrastructures, and more particularly, systems that automatically select an application programming interface for use in connecting one or more components of the converged infrastructure with management software. Component information is obtained for a particular component within the converged infrastructure. The component information is used in conjunction with various selection metrics to identify an applicable application programming interface.

12 Claims, 4 Drawing Sheets

DYNAMIC AND ADAPTIVE PROGRAMMATIC INTERFACE SELECTION (DAPIS)

TECHNICAL FIELD

Aspects of the present disclosure relate to application programming interfaces, and in particular, to the automatic and dynamic selection of an application programming interface during run-time of software in a converged infrastructure.

BACKGROUND

Converged infrastructures combine multiple information technology ("IT") computing components into pools of resources that may be accessed in a centralized and efficient manner. For example, a converged infrastructure may include pools of compute, storage, and network devices that may be shared and accessed by multiple applications. In addition to pooling computing components, converged infrastructures typically include management software that may be used to manage, automate, and/or orchestrate the pooled resources.

While the convergence of different IT computing components within a converged infrastructure may promote utilization efficiencies, the disparate nature of the computing resources included within the converged infrastructure may present challenges. For example, converged infrastructures typically include a large mix of heterogeneous computing resources, all of which may require different application programming interfaces ("APIs") when interfacing with management software. Conventional methods for handling multiple APIs involve statically configuring each API for each computing component included within the converged infrastructure, which is inefficient and lacking in resiliency, robustness, resulting in time-consuming and labor-intensive coding.

SUMMARY

Aspects of the present disclosure involve converged infrastructures, and more particularly, systems that automatically select an application programming interface for use in connecting one or more components of the converged infrastructure with management software. Component information is obtained for a particular component within the converged infrastructure. The component information is used in conjunction with various selection metrics to identify an applicable application programming interface.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure involve systems and/or methods for dynamically selecting an application programming interface ("API") for a particular computing component included within a converged infrastructure, which enables the computing component to communicate with management software included within the same converged infrastructure. A converged infrastructure generally refers to a specific type of computing infrastructure that packages multiple, heterogeneous, computing components into a single and optimized computing platform. Typical computing components include servers, storage devices, virtualization components, networking components, and the like. Additionally, converged infrastructures include application software for the management, automation, and/or orchestration (i.e. management software) of such computing components. Converged infrastructures are often used in the Information Technology ("IT") community in an attempt to centralize, consolidate, and optimize the management of IT computing components and resources.

The system disclosed herein may select the API for the particular computing component from a set of APIs associated with the particular computing component based on various API selection metrics. For example, the system may assess the failure rates, time out rates, response latency, etc., of a given API and apply these metrics to component information corresponding to the particular computing component obtained by the system. Any selected API(s) may be loaded or otherwise accessed to service any communication requests made between the computing component for which the API was selected and the management software.

Figure 1:
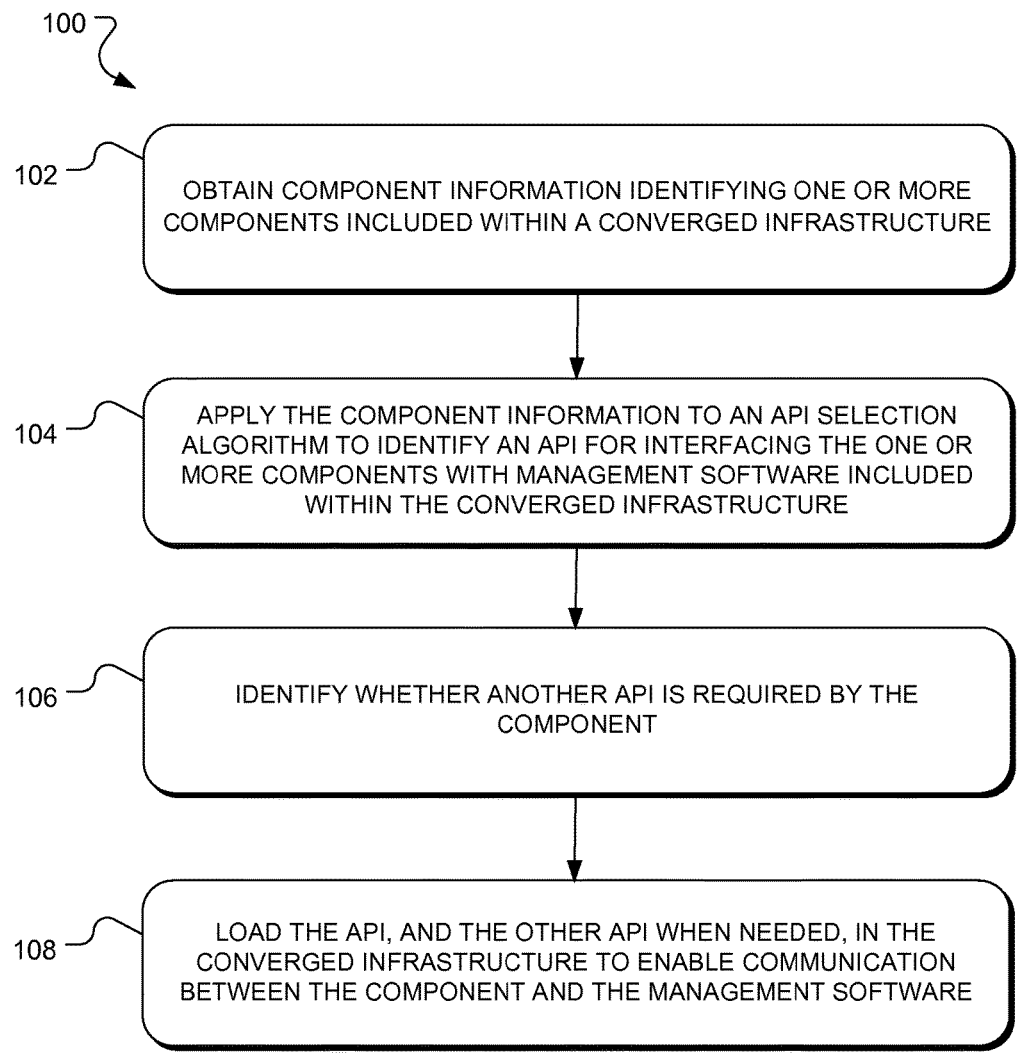
FIG. 1 is a flowchart illustrating an example process automatically selecting an application programming interface, according to aspects of the present disclosure.
Figure 2A:
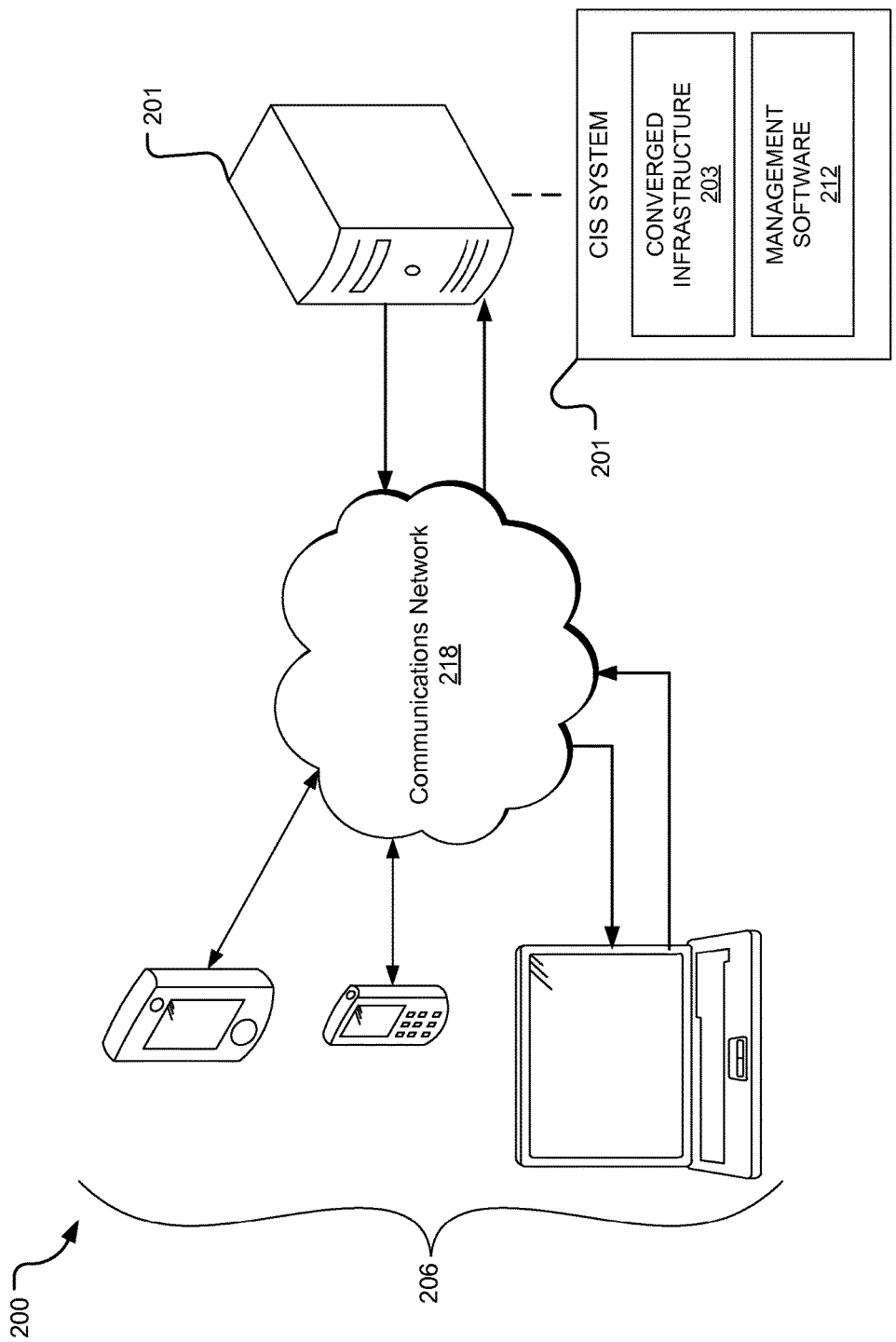
FIGS. 2A-2B are block diagrams illustrating a computing environment for automatically selecting an application programming interface, according to aspects of the present disclosure.
Figure 2B:
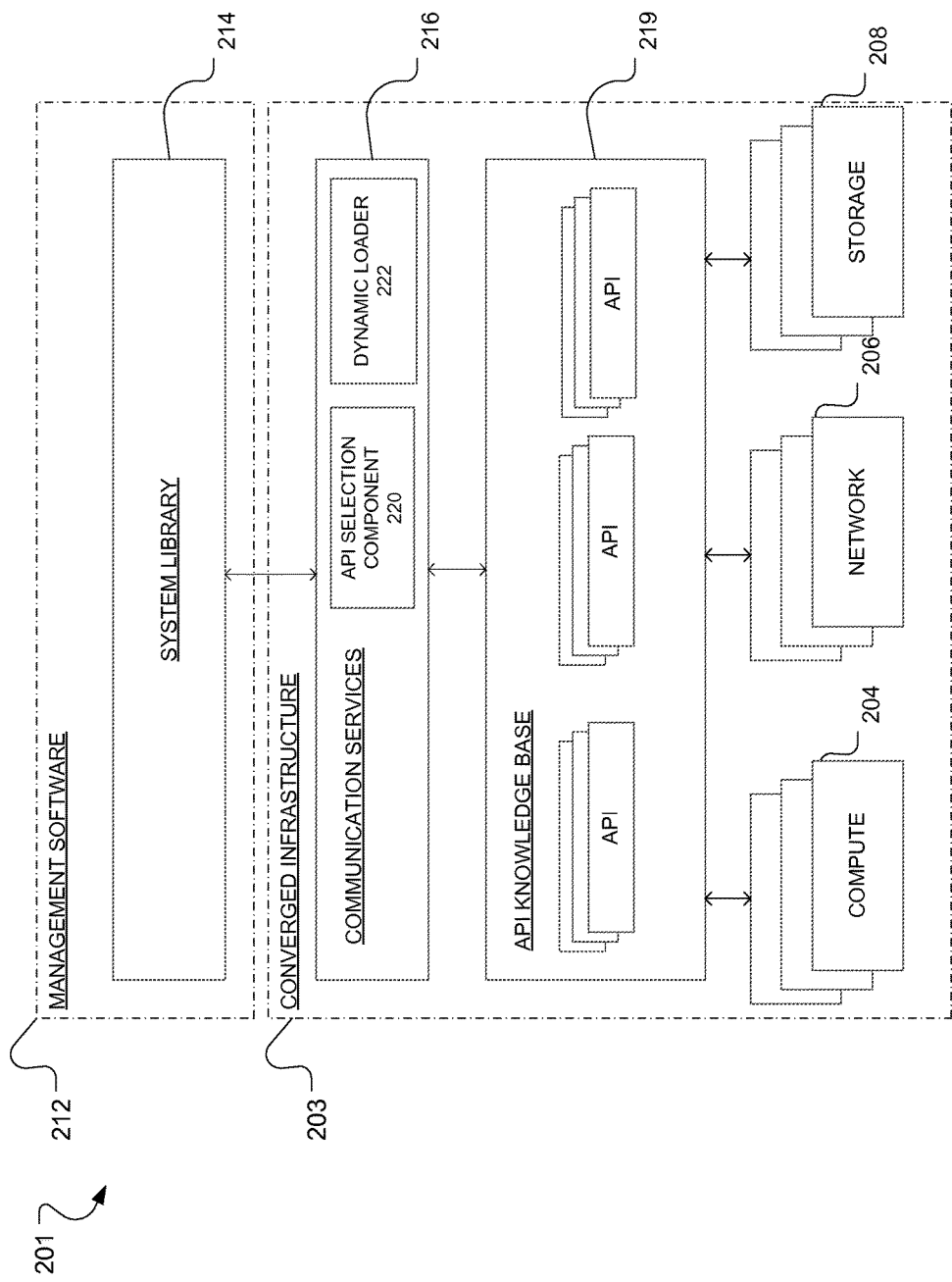

An illustrative process and/or system for automatically selecting APIs for connecting a computing component included within a converged infrastructure to management software included in the same converged infrastructure, is depicted in FIGS. 1 and 2A-2B. In particular, FIG. 1 illustrates an example process 100 for automatically selecting an API. FIGS. 2A and 2B illustrate a computing architecture 200 including hardware and/or software components that may be used to perform or otherwise execute the process 100 of FIG. 1.

Referring generally to FIGS. 2A-2B and initially to FIG. 2A, the computing architecture 200 includes a converged infrastructure system ("CIS System") 201 configured to provide pools of computing components within a converged infrastructure 203 that may be managed by a management software 212. The pooled computing components may be utilized, for example, as a service, at one or more client devices 206 over a communication network 218, which may be the Internet, an Intranet, and Ethernet network, a wireline network, a wireless network, and/or another communication network. For example, and IT administrator may use the management software 212 to monitor the system health, compliance, Inventory, etc., of the converged infrastructure 203. The client device(s) 206 may be a personal computer, work station, server, mobile device, mobile phone, tablet device, of any suitable type. In one particular embodiment, the CIS System 201 may be a Vblock™ Systems converged infrastructure and the management software 212 may be VCE Vision™ Intelligent Operations management software that provides an integrated set of software tools for managing, in near real-time, various computing components of the converged infrastructure 203.

As illustrated in FIG. 2B, the computing components pooled by the CIS system 201 and included within the converged infrastructure 203 may include one or more compute, network, and/or storage components 204-208 (collectively referred to herein as "computing components") that may be managed, monitored, logged, etc., by the management software 212. Stated differently, the management software 212, when executed, may be configured to manage and monitor the computing components 204-208, such as for example, to determine whether a component is performing as designed.

To enable communication between the management software 212 and any of the computing components 204-208, the management software 212 includes a system library 214 that provides a set of routines, functions, and variables, which when accessed, enable the discovery, identification, configuration, monitoring, logging, and rediscovery of the various computing components 204-208 included within the converged infrastructure 203. The system library 214 may be logically connected to a communication services component 216 included in the converged infrastructure 203 that is responsible for servicing any communication requests between the system library 214 of the management software 212 and the various computing components 204-208. The communication services component 216 may include an API knowledge base 219 containing all of the API(s) supported by each individual computing component 204-208 and any associated data required to enable the APIs, such as schemas, management information databases ("MIBs"), profiles, metadata, authorization and authentication processes (including how to obtain any access credentials), and/or any required software libraries, etc. To select an API for use in servicing communication requests between the computing components 204-208 and the management software 212, the communication services component 216 may initiate a dynamic API selection component 220 that accesses the API knowledge base 219 to identify one or more APIs for use with the computing components 204-208. Additionally, the communication services component 216 may include a dynamic loader 222 for loading any selected APIs.

Referring now to FIG. 1, process 100 begins with obtaining component information uniquely identifying one or more components included within a converged infrastructure (operation 102). In particular, the dynamic API selection component 220 of the communication services component 216 may receive component information corresponding to one or more of the computing components 204-208 included within the converged infrastructure 203. The component information may include the identification of a specific instance of a computing component as well as information describing a specific release/version of the identified computing component instance. For example, assume an IT department is interested in monitoring two instances of the same server, "instance A" and "instance B" (e.g. a compute device 204), currently executing in a converged infrastructure. Instance A of the server is an older release, has limited API capabilities, and requires a 1.2 version of API metadata to interface. In contrast, instance B of the server is a newer release, has been updated with more API capabilities, and requires a newer 1.5 version of API metadata to interface.

The component information may include unique identification of the server, each server instance (A and B) and any of the version/release information for each instance. The component information may be obtained according to any suitable manner, such as for example, using both push and/or pull data mechanisms.

Referring back to FIG. 1, the received component information is accessed and applied to an API selection criteria algorithm that determines, selects, or otherwise identifies an API(s) for interfacing the identified computing component with management software (operation 104). In particular, the selection criteria algorithm performs API selection by assessing on one or more selection metrics that describe various characteristics of the APIs defined within the API knowledge base 219. For example, the selection metrics may include analyzing the software release and/or version of the identified computing component and selecting an API that supports the specific version of the component identified within the component information.

As another example, the selection metrics may include past execution metrics of an API, such as failure/timeout rates, and response latency, which may be analyzed to select an API for the identified computing component. The selection metrics may further include metrics evaluating the capabilities of the API, such as the API's data request service level (how much data is provided by the API), the type of objects the API may provide, and the like. Thus, the API selection criteria algorithm provides a mechanism that automatically identifies one or more APIs that the identified component may employ when interfacing with the communication services component 216 of the converged infrastructure 203. In one particular embodiment, the API selection component 220 may execute the API selection criteria algorithm using component information and/or selection metrics collected during the run-time of the management software 212 executing within the converged infrastructure 203, thereby causing the API selection to be dynamic.

An illustrative example for selecting API(s) using the API selection criteria algorithm will now be provided with reference to the server instances A and B described above. Assume instance A supports two different APIs: a first API and a second API. Generally speaking, both APIs provide the same data and functionality; however, the first API takes longer to access data and respond. Stated differently, the API response time, or the latency of the first API is longer than the second API. The API selection criteria algorithm may consider the response time of each API and compare such times to a response time threshold that indicates a maximum amount of time that a given API may use when responding to, for example, a communication request between the computing components 204-208 and the management software system library 20. Since the response time of one API is greater than the threshold, the API selection criteria algorithm may select the other, more responsive API. In the case of the instance A server, the API selection criteria algorithm would select the first API.

Referring back to FIG. 1, once an API is selected, a determination is made whether another API is needed (operation 106). In some instances, the selected API may not provide enough data and/or data access to support the communication needs of the identified component. Thus, the API selection criteria algorithm may select another API. For example and referring again to instance A and B of the server component, assume the instance B server supports two different APIs: a third API and a fourth API. Assume further, that the third API does not provide sufficient data, or that the service data level of the third API is insufficient to support instance B server. Such circumstances may arise when a component supports multiple APIs and the capabilities of the supported APIs are not equal, thus requiring the component to access data from both supported APIs. Accordingly, referring to instance B server, the API selection criteria algorithm may analyze the data service of the third and fourth API and determine that both APIs are required to support the instance B server. Accordingly, the API selection criteria algorithm may identify both the third and the fourth API from the API knowledge base 219. In one embodiment, if multiple APIs are required, the API selection criteria algorithm may generate a preference ordering of all of the API(s) identified for the computing component.

Once a specific API has been selected, and optionally, any additional APIs, for the identified component, the selected API(s) are loaded to enable communication between the identified component and the converged infrastructure (operation 108). In the illustrated embodiment of FIG. 2B, the selected API is loaded by the dynamic loader 222 of the communication services component 216 to enable the identified component to communicate with system library 214 of the management software 212. More particularly, the required code libraries, schemas, management information bases, profiles, metadata, and/or the like corresponding to the selected API may be loaded into the management software 212 and/or the converged infrastructure 203. Subsequently, the loaded API may be used to access the set of functions, included within the system library of the management software 212. For example, various functions may be accessed to manage the various compute 204, network 206, and storage 208 devices.

Thus, various aspects of the present disclosure enable the dynamic selection of API(s) for software applications that manage converged infrastructures. Moreover, the disclosed systems support multiple and different API releases for single instances and/or multiple instances of various computing components involved in a converged infrastructure. Further, the disclosed systems may identify the API(s) based on potential optimizations based on latency, failure rate, etc., and/or identify multiple API(s) to combine data from the multiple API(s).

Figure 3:
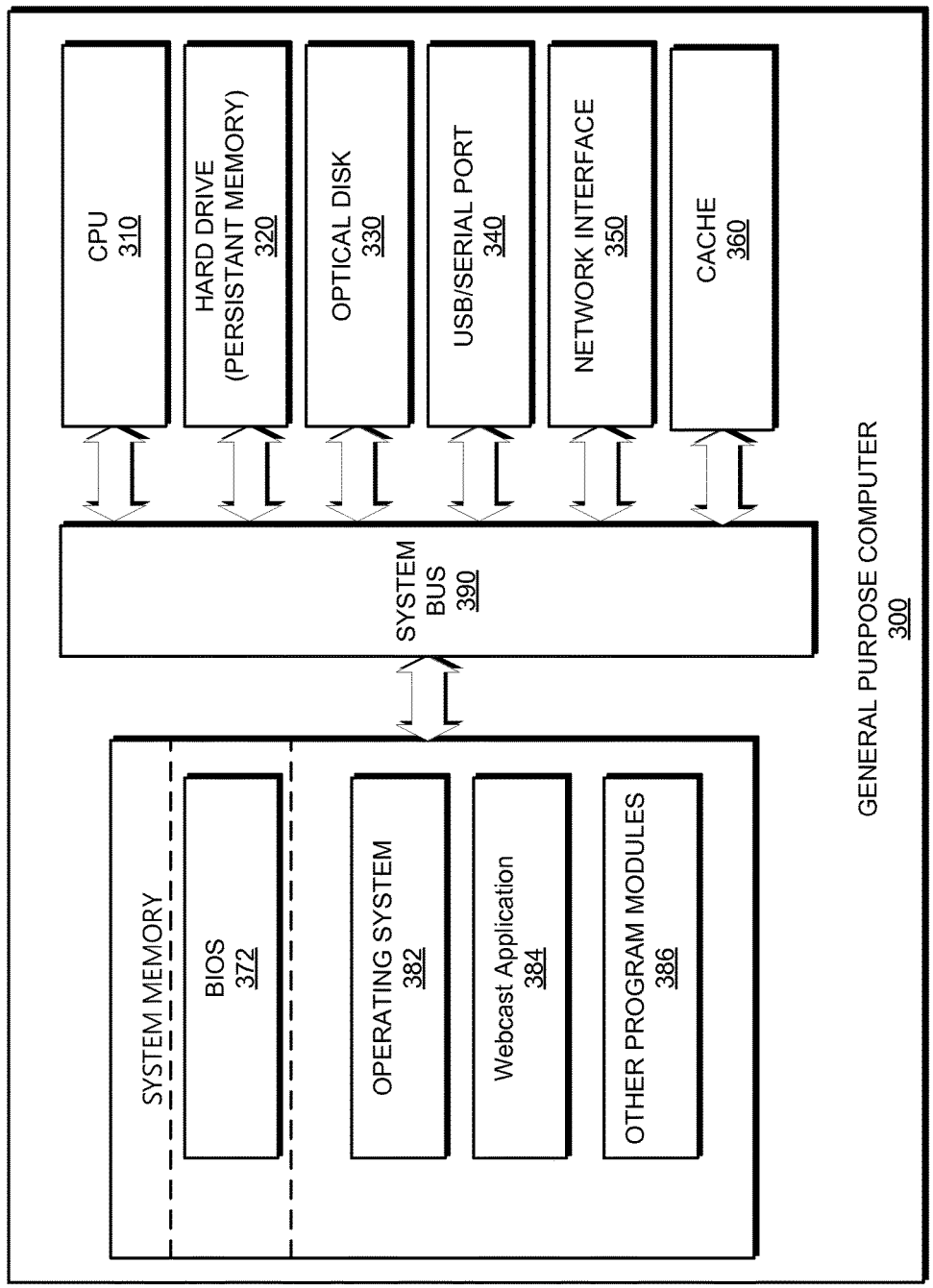
FIG. 3 is illustrates an example computing device, according to aspects of the present disclosure.

FIG. 3 illustrates an example general purpose computer 300 that may be useful in implementing the described systems (e.g. the server 201). The example hardware and operating environment of FIG. 3 for implementing the described technology includes a computing device, such as general purpose computing device in the form of a personal computer, server, or other type of computing device. In the implementation of FIG. 3, for example, the general purpose computer 300 includes a processor 310, a cache 360, a system memory 320 and a system bus 390 that operatively couples various system components including the cache 360 and the system memory 320 to the processor 310. There may be only one or there may be more than one processor 310, such that the processor of the general purpose computer 300 comprises a single central processing unit (CPU), or a plurality of processing units, commonly referred to as a parallel processing environment. The general purpose computer 300 may be a conventional computer, a distributed computer, or any other type of computer; the disclosure included herein is not so limited.

The system bus 390 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) and random access memory (RAM). A basic input/output system 372 (BIOS), containing the basic routines that help to transfer information between elements within the general purpose computer 300 such as during start-up may be stored in ROM. The general purpose computer 300 further includes a hard disk drive 320 for reading from and writing to a persistent memory such as a hard disk, not shown and an optical disk drive 330 for reading from or writing to a removable optical disk such as a CD ROM, DVD, or other optical medium.

The hard disk drive 320 and optical disk drive 330 are connected to the system bus 390. The drives and their associated computer-readable medium provide nonvolatile storage of computer-readable instructions, data structures, program engines and other data for the general purpose computer 300. It should be appreciated by those skilled in the art that any type of computer-readable medium which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, or elsewhere, including an operating system 382, an application 384, and one or more other application programs 386. A user may enter commands and information into the general purpose computer 300 through input devices such as a keyboard and pointing device connected to the USB or Serial Port 340. These and other input devices are often connected to the processor 310 through the USB or serial port 340 and network interface 350 that is coupled to the system bus 390, but may be connected by other interfaces, such as a parallel port. A monitor or other type of display device may also be connected to the system bus 390 via an interface (not shown). In addition to the monitor, computers typically include other peripheral output devices (not shown), such as speakers and printers.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for selecting an application programming interface comprising:
   obtaining, by at least one processor, component information comprising a unique identifier identifying a specific executing instance of a computing component included within a computing infrastructure, the component information further comprising data identifying a specific version of the specific executing instance of the computing component, the computing component associated with a plurality of application programming interfaces that enable the computing component to interface with a management software included within the computing infrastructure;
   dynamically configuring, by the at least one processor, an application programming interface implementation customized to the computing component by:
      selecting, from the plurality of application programming interfaces supported by the at least one processor, a subset of one or more application programming interfaces to configure based on analyzing the specific version of the specific executing instance of the computing component; and
      dynamically configuring the selected subset of the one or more application programming interfaces based on the component information, the dynamic configuration causing communication of the computing component within the computing infrastructure by loading a code library of the selected subset of the one or more application programming interfaces into the management software to allow the one or more application programming interfaces to access, in a system library of the management software, a set of functions.

2. The method of claim 1, further comprising servicing any communication requests between the management software and the computing component using the application programming interface.

3. The method of claim 2, further comprising:
   determining whether the application programming interface provides sufficient data access to a type of data required to enable the computing component to service the communication requests;
   identifying another application programming interface of the plurality of application programming interfaces when the data access is not sufficient; and
   accessing the another application programming interface of the plurality of application programming interfaces from the management software.

4. The method of claim 1, wherein the computing component is at least one of a networking component, storage component, or a compute component and wherein identifying the application programming interface of the plurality of application programming interfaces occurs during run-time of the management software.

5. A system for selecting an application programming interface comprising:
   a computing infrastructure maintained at a server, the computing infrastructure comprising a plurality of computing components and a management software configured to manage the plurality of computing components; and
   wherein the server is configured to:
      obtain computing component information comprising a unique identifier identifying a specific executing instance of a computing component of the plurality of computing components, the computing component associated with a plurality of application programming interfaces that enable the computing component to interface with the management software the component information further comprising data identifying a specific version of the specific executing instance of the computing component;
      dynamically configure, by the server, an application programming interface implementation customized to the computing component by:
         selecting, from the plurality of application programming interfaces supported by the server, a subset of one or more application programming interfaces to configure based on analyzing the specific version of the specific executing instance of the computing component; and
         dynamically configure the selected subset of the one or more application programming interfaces based on the component information, the dynamic configuration causing communication of the computing component within the computing infrastructure by loading a code library of the selected subset of the one or more application programming interfaces into the management software to allow the one or more application programming interfaces to access a set of functions included in a system library of the management software and thereby enable communication between the computing component and the computing infrastructure.

6. The system of claim 5, wherein the server is further configured to service any communication requests between the management software and the computing component using the application programming interface.

7. The system of claim 6, wherein the server is further configured to:
   determine whether the application programming interface provides sufficient data access to a type of data required to enable the computing component to service the communication requests;
   identify another application programming interface of the plurality of application programming interfaces when the data access is not sufficient; and
   access the another application programming interface of the plurality of application programming interfaces from the management software.

8. The system of claim 5, wherein the computing component is at least one of a networking component, storage component, or a compute component and wherein identifying the application programming interface of the plurality of application programming interfaces occurs during run-time of the set of the functions included in the system library of the management software.

9. A non-transitory computer readable medium including instructions for selecting an application programming interface, the instructions, executable by a processor, comprising:
   obtaining computing component information comprising a unique identifier identifying a specific executing instance of a computing component included within a computing infrastructure, the component information further comprising data identifying a specific version of the specific executing instance of the computing component, the computing component associated with a plurality of application programming interfaces that enable the computing component to interface with a management software included within the computing infrastructure;

dynamically configuring, by the processor, an application programming interface implementation customized to the computing component by:

selecting, from the plurality of application programming interfaces supported by the processor, a subset of one or more application programming interfaces to configure based on analyzing the specific version of the specific executing instance of the computing component; and dynamically configuring the selected subset of the one or more application programming interfaces based on the component information, the dynamic configuration causing communication of the computing component within the computing infrastructure by loading a code library of the selected subset of the one or more application programming interfaces into the management software to allow the one or more application programming interfaces to access a set of functions included in a system library of the management software and thereby enable communication between the computing component and the computing infrastructure.

10. The non-transitory computer readable medium of claim 9, further comprising servicing any communication requests between the management software and the computing component using the application programming interface.

11. The non-transitory computer readable medium of claim 10, further comprising:

determining whether the application programming interface provides sufficient data access to a type of data required to enable the computing component to service the communication requests;

identifying another application programming interface of the plurality of application programming interfaces when the data access is not sufficient; and accessing the another application programming interface of the plurality of application programming interfaces from the management software.

12. The non-transitory computer readable medium of claim 9, wherein the computing component is at least one of a networking component, storage component, or a compute component and wherein identifying the application programming interface of the plurality of application programming interfaces occurs during run-time of the set of functions included in a system library of the management software.

* * * * *